United States Patent Office 2,833,614
Patented May 6, 1958

2,833,614

METHOD OF MILDEWPROOFING CELLULOSE FIBER BY ETHERIFYING, ESTERIFYING, AND QUATERNIZING THE CELLULOSE

Paul William Kersnar, Baltimore, Md.

No Drawing. Application February 16, 1954
Serial No. 410,703

1 Claim. (Cl. 8—120)

This invention relates to a method of mildew-proofing cellulosic fabrics and materials. The principal object of the invention is to provide a method for the above purpose which will be relatively simple and economical to use and highly efficient in its results.

Another object of the invention is to provide a method of treating cellulosic materials which will substantially immunize the materials to the attacks of the mildew producing organic micro-organisms without injury to the color or desirable physical properties of the materials being treated.

A further object is to provide a highly efficient mildew-proofing process which will not materially increase the weight nor decrease the tensile strength of the materials, which will be substantially permanent in its results, and which will not interfere with subsequent dyeing of the materials.

Other objects and advantages in the improved mildew-proofing process and in the means for carrying out the process will become more apparent from the following detailed description thereof.

Some present methods impregnate the fabric or materials. This increases the weight of the material and the results are short lived since the mildew-proofing elements are soon lost from the fibers and other present methods are not practical for all uses due to the discoloration of the treated material.

Attempts have been made to alter the cellulose molecule of the material so as to permanently render the material itself mildew resistant without discoloration. These attempts have not been satisfactory due to the fact that the alteration of the molecular structure of the cellulose molecule resulted in decreasing the mechanical strength and wearing qualities of the material.

This invention provides a method and means whereby the cellulose molecule is not altered, per se, but is utilized to form a new molecule which is resistant to microbiological deterioration without destroying the desirable qualities of the original cellulose molecule.

The cellulose molecule is a long chain polymer of anhydro-glucose units (see Mathews' "Textile Fibers," fifth edition, chapter IV, John Wiley and Sons). Spaced along these long chain molecules are hydroxyl groups, theoretically five per glucose unit. Due, however, to the hydroxyls used in lactone and in 1–4 glucosidic unions to form the cellulose chain, only three hydroxyls remain for reaction as shown by the following formula which will be herein designated as Formula No. 1:

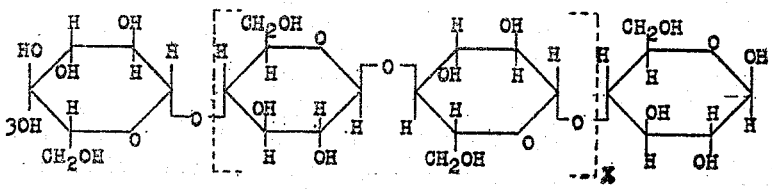

While one of the hydroxyls is a primary one and the other two are secondary, none is sufficiently reactive to cause substitution in reasonable lengths of time, or without employing drastic conditions. For example, cellulose will not react with phthalic anhydride under the conditions for determination of hydroxyl number, and any attempt to determine its hydroxyl number by that method results in a value of substantially zero, an obviously incorrect figure.

If, however, an epoxide is reacted with the cellulose under proper conditions, there are created sufficiently active hydroxyls to react with phthalic anhydride and the hydroxyl numbers of such products can be accurately determined by the phthalic anhydride method. If we shorten the Formula No. 1 above to $R(OH)_3$ as representing the cellulose molecule, the reaction, which will be herein designated as Reaction No. 1, proceeds with the epoxide, ethylene oxide, as follows:

$$R(OH)_3 + (CH_2)_2O \xrightarrow{\text{alkali}} R(OH)_2O(CH_2)_2OH$$

This reaction is well known in the literature, many references being made to the production of hydroxy-ethyl-cellulose to form water soluble gums.

Since the hydroxyl groups so formed are reactive, esterification reactions can now be accomplished with relative ease. For the purpose of this invention, the hydroxyl group is esterified by reaction with a sulfonyl chloride in the presence of a tertiary amine which serves to remove liberated hydrogen chloride. The following reaction, which will be herein designated as Reaction No. 2, takes place:

$$R(OH)_2O(CH_2)_2OH + C_6H_5SO_2Cl + R'_3N \longrightarrow$$
$$R(OH)_2O(CH_2)_2O-SO_2C_6H_5 + R'_3N \cdot HCl$$

The sulfonate ester of cellulose, formed as shown above, will now react with a tertiary amine to form a quaternary ammonium sulfonate in accordance with the well-known reaction used in qualitative organic chemistry to identify tertiary amines (see, for example, Shriner and Fuson, "Identification of Organic Compounds," page 147, John Wiley and Sons, 1935). The following reaction, which will be herein designated as Reaction No. 3, takes place:

$$R(OH)_2O(CH_2)_2O-SO_2C_6H_5 + R'_3N \xrightarrow{\text{heat}}$$
$$[R(OH)_2O(CH_2)_2-N-R'_3] + [C_6H_5SO_3]$$

While the hydroxy-ether shown to be formed in Reaction No. 1 has only one hydroxyl group substituted on the anhydro-glucose unit, it is probable that more than one is actually formed. For the purpose of this invention, this is not considered important. What is important is that reactive hydroxyl alkyl ether groups be created in random substitution all along the cellulose chain. This type of substitution does not degrade the cellulose fiber or fabric inasmuch as reaction occurs only on the exposed surface molecules. Random surface substitution provides protection against attack by micro-organisms without adding materially to the weight of the fiber or fabric or without materially affecting its desirable properties.

After formation of the quaternary ammonium sulfonate, as shown in Reaction No. 3, ion exchange reactions can be carried out with the altered cellulose. For example, an alcoholic sodium hydroxide reacts by removing the substantially alcohol-insoluble sodium benzene sulfonate and leaving the cellulose quaternary ammonium hydroxide. This hydroxide can then be reacted with acid substances such as hydrochloric, oleic, stearic acids, pentachlorophenal, phenol, and the like, or ion exchange can be made to occur in water solutions with soluble salts of these acids. The latter reactions are not normally necessary to accomplish the objects of this invention. However, they may be desired for special applications, and form a part of the present invention.

The present invention utilizes the above series of reactions and procedures for the purpose of producing cellulosic fibers or fabrics which will be permanently resistant to micro-biological attack without injury to the appearance or mechanical qualities of the fibers or fabrics.

This improved method comprises a series of successive steps, as follows:

*Step 1—(Impregnation).*—The cellulosic material is first treated in an aqueous alkali bath until wetted. The strength of the alkaline solution can be varied except that it is found that a 5–10% solution by weight provides adequate alkaline concentration to make the next step sufficiently rapid. The preferred alkali is sodium hydroxide because of both its strength and economy, although other alkalis, such as potassium hydroxide, may be used. After impregnation, the cellulosic material is freed from an excess of the alkaline solution by any suitable means such as squeezing through rollers, centrifuging, filtering, etc.

*Step 2—(Substitution).*—The alkali treated cellulose is brought into contact, while still moist, with an epoxide. This contact can be with the epoxide in the vapor state or dissolved in a suitable solvent, such as carbon tetrachloride. For the purposes of this invention, it is preferred to use such readily available and easily vaporizable epoxides as ethylene or propylene oxides, although many other epoxides will react in a similar manner and produce suitable hydroxy alkyl ether groups. When the alkali cellulose comes into contact with the vapors of ethylene or propylene oxide an exothermic reaction occurs and the oxide reacts with the hydroxyl groups of the cellulose to form hydroxyl-ether groups. The extent of substitution can be controlled by varying the time of contact and can be measured by analysis to determine the percentage of hydroxyl formed.

*Step 3—(Neutralization).*—The reacted cellulose is treated with a dilute acid solution to neutralize the excess alkali. Sulfuric acid, for economic reasons, is preferred for the acid wash step.

*Step 4—(Water wash).*—The neutralized cellulosic material is thoroughly washed with clear water until free of salts and acid.

*Step 5—(Drying).*—The washed material is passed to any suitable drier or drying chamber to remove all residual surface water.

*Step 6—(Esterification).*—The dried cellulosic material is brought into contact with a solution containing an aromatic sulfonyl chloride, such as benzene or p-toluene sulfonyl chloride, and a tertiary amine, such as trimethyl, triethyl or benzyl dimethyl amine. The solvent used can be benzol, a chlorinated hydrocarbon or a petroleum naphtha. While the above mentioned compounds and solvents are suitable, it is to be understood that other similar materials are also usable, and within the scope of this invention. The sulfonyl chloride reacts to form the sulfonate ester and the tertiary amine hydrochloride precipitates as crystals. After completion of the reaction, the cellulosic material and the precipitated tertiary amine hydrochloride are filtered or otherwise separated from the solvent and the latter can be re-used. The reactants, namely, sulfonyl chloride and tertiary amine, can be replenished as their concentration diminishes below a point at which reaction can reasonably be expected to occur. The tertiary amine is readily regenerated for re-use by the normal methods of treatment of the hydrochloride with suitable alkaline solutions.

*Step 7—(Quaternizing).*—The cellulosic material from step 6 is heated with a tertiary amine to form the cellulose quaternary ammonium sulfonate. The tertiary amine may be in the form of a vapor, or it may be dissolved in a suitable solvent, such as benzol. Any tertiary amine may be employed, since such widely different substances as trimethyl amine and o-hydroxy m-butylbenzyl dimethyl amine will react to a sufficient degree to produce the improved results of this invention.

The seven steps enumerated above can be amalgamated into a continuous process, and a desired degree of substitution of reacting materials can be obtained by regulating the time of contact and the reactant concentrations. Thus, either cotton yarn, cotton fibers or cotton fabric could be continuously fed into a suitable successive arrangement of vessels, or chambers to submit the fibers or fabrics to the successive steps in continuous succession.

When tested in accordance with the methods described by Thom et al. (Thom, C., Humfield H., and Holman, H. P., Am. Dyestuff Reptr. 23, 581–586 (1934)), fabrics treated as above described showed no mold growth after 14 days' incubation using *Chaetomium globosum* as the inoculating organism.

To further illustrate the improved method and means for mildew-proofing the following examples are submitted.

Example 1

Twenty grams of cotton cloth swatches, 3" x 4", were immersed in a water solution containing 5% by weight of NaOH for 5 minutes. The swatches were then blotted as dry as possible with paper towels. They were then placed in a corked one liter wide mouth bottle which contained 5 cubic centimeters of propylene oxide. The propylene oxide was allowed to vaporize at room temperature. After one hour the temperature of the gaseous phase rose from 20 degrees C. to 24 degrees C. The swatches were then removed from the bottle, rinsed in dilute hydrochloric acid and then in water. They were then dried and a sample was analyzed for hydroxyl content by the phthalic anhydride method. Results obtained were: original cotton cloth used, 0.0%; treated cotton, 7.3% by weight hydroxyl. The swatches were then placed in a solution of benzol containing 3% by weight of p-toluene sulfonyl chloride and 2% by weight of triethyl amine and allowed to stand for 30 minutes at room temperature. Crystals of triethyl amine hydrochloride were precipitated. The swatches were removed, rinsed with isopropyl alcohol and water, dried and placed in a solution of petroleum naphtha (boiling range 235–385 degrees F.) which contained 3% by weight of benzyl dimethyl amine. The solution was heated to 85° C., under reflux, for 30 minutes after which time the swatches were removed, rinsed with the naphtha and dried. A sample was treated with N/100 alcoholic KOH for two hours, following which a filtered aliquot was titrated with N/100 HCl. Calculation showed that 0.75% on the weight of the cloth of p-toluene sulfonic acid was exchanged for by the KOH. Samples of the cloth treated as above were resistant to micro-biological attack when tested by the method of Thom et al. referred to above. In addition, it was observed that contaminant bacterial colonies grew on one of the plates containing a control (untreated) cotton swatch, while no such growth was observed at ay time on the plates containing the treated swatches.

Example 2

The technique described above in Example 1 was repeated except that benzyl dimethyl amine was used in both the esterification and quaternizing steps with similar satisfactory results.

Example 3

Twenty-five grams of cotton fibers were immersed in 1000 cc. of an aqueous solution containing 100 grams of NaOH. The cotton was then squeezed as dry as possible of excess solution. The moist fibers were then placed in a desiccator into which 5 grams of ethylene oxide was admitted. After 30 minutes the cotton was removed, neutralized in a dilute solution of sulfuric acid, then rinsed thoroughly in distilled water and dried. The percent of hydroxyl, by weight was found to be 5.8%. The cotton was then placed in a solution of carbon tetrachloride containing 2% by weight of benzene sulfonyl chloride and 2% by weight of trimethyl amine. After 30 minutes standing at room temperature, the cotton was removed and rinsed with carbon tetrachloride and dried. The cotton was then placed in a solution of benzol containing 4% by weight of o-hydroxy m-butyl benzyl dimethyl amine (obtained from Rohm and Haas and known as DMP–14). The mixture was boiled under reflux for 30 minutes. The cotton was then taken out, rinsed with benzoyl, isopropyl alcohol and water and dried. A portion of the cotton was then immersed in water for 24 hours, the water being changed six times during this period. Following this the untreated cotton, the treated, but unleached cotton, and the treated and leached cotton were all placed in a humidified desiccator containing actively growing mold and allowed to stand for a period of 21 days at 35 degrees C. At the end of that period the untreated cotton was completely covered with mold growth and had deteriorated noticeably in tensile strength. Both the leached and unleached treated cottons were free of mold growth and appeared to have the same tensile strength as the originals.

The structural formula of the compound formed can be shown as follows:

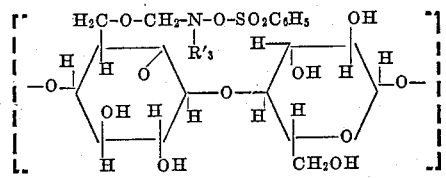

While preferred forms of the invention have been described in some detail together with the theories which it is believed to best explain its success, it is to be understood that the invention is not limited to the precise procedure described nor is dependent upon the accuracy of the theories which have been advanced. On the contrary, the invention is not to be regarded as limited except insofar as such limitations are included within the terms of the accompanying claim in which it is the intention to claim all novelty inherent in the invention as broadly as is permissible in view of the prior art.

Having thus described the invention, what is claimed and desired secured by Letters Patent is:

A method of mildew-proofing cellulose fiber comprising: impregnating said fiber at room temperature with a 5 to 10 percent aqueous alkali metal hydroxide solution for approximately 5 minutes and then removing the excess of alkaline solution adhering to the fiber; contacting the moist alkali treated fiber with a vapor of an epoxide of the group consisting of ethylene and propylene oxide at room temperature for approximately one hour to form with the hydroxyl groups of the cellulose, random hydroxyl ether groups; neutralizing the excess alkali on the fiber with a dilute acid solution followed by thorough washing with clear water until free of salts and acid; drying the fiber to remove residual surface water; contacting the fiber with a solution containing an aromatic sulfonyl chloride to react with the random hydroxyl ether groups to form sulfonate ester groups by immersing the above dried fiber in a solution containing an aromatic sulfonic chloride of the group consisting of benzene sulfonyl chloride and p-toluene sulfonyl chloride, said solution also containing a tertiary amine of the group consisting of trimethyl amine, triethyl amine, and benzyl dimethyl amine; the solvent in said solution being one of a group consisting of benzol, a chlorinated hydrocarbon, and petroleum naphtha; rinsing the fiber with alcoholic water to remove any hydrochloride salt adhering to the fiber followed by drying of the fibers; and then reacting the random sulfonate ester groups so formed on said fiber to form quaternary ammonium sulfonate groups by heating the fibers so dried for approximately 30 minutes at a temperature of approximately 85° C. in an approximately 3 percent benzol solution of a tertiary amine of the group consisting of trimethyl amine, triethyl amine, and o-hydroxy m-butyl benzyl dimethyl amine.

References Cited in the file of this patent

UNITED STATES PATENTS

| | | |
|---|---|---|
| 2,146,738 | Haskins | Feb. 14, 1939 |
| 2,265,919 | Lilienfeld | Dec. 9, 1941 |
| 2,545,492 | Reid et al. | Mar. 20, 1951 |
| 2,609,270 | Couper | Sept. 2, 1952 |
| 2,680,057 | Janes | June 1, 1954 |